United States Patent [19]

Dewaele

[11] 3,874,095
[45] Apr. 1, 1975

[54] EDUCATIONAL AID FOR TEACHING INEQUALITIES

[76] Inventor: Kay L. Dewaele, 224 Murphy St., Bay City, Mich. 48706

[22] Filed: Mar. 6, 1973

[21] Appl. No.: 338,574

[52] U.S. Cl. ............................................. 35/31 R
[51] Int. Cl. ........................................... G09b 19/02
[58] Field of Search .......... 35/30, 31 R, 31 E, 31 F, 35/35 H, 66

[56] References Cited
UNITED STATES PATENTS

| | | | |
|---|---|---|---|
| 1,931,378 | 10/1933 | Fancher | 35/66 |
| 2,867,917 | 1/1959 | Carlton | 35/35 H |
| 2,884,714 | 5/1959 | Lawrence | 35/31 F |
| 3,514,873 | 6/1970 | Stobbe | 35/31 F |
| 3,789,517 | 2/1974 | Romstad | 35/31 E |

*Primary Examiner*—Wm. H. Grieb
*Attorney, Agent, or Firm*—John J. Swartz

[57] ABSTRACT

An educational device for demonstrating mathematical relationships between quantities including a support, a plurality of bound pages on the support bearing indicia at opposite ends of the support representing a plurality of different quantities, and an inequality sign movable on the support to selected positions between the indicia at opposite ends of the support for selectively indicating that the quantity represented at one end of the support is greater than or less than the quantity represented at the other end of the support.

15 Claims, 5 Drawing Figures

PATENTED APR 1 1975　3,874,095

EDUCATIONAL AID FOR TEACHING INEQUALITIES

BACKGROUND OF THE INVENTION

This invention relates to an educational aid for teaching mathematical relationships between quantities and more particularly to teaching apparatus incorporating a movable inequality sign for teaching inequalities.

An object of the present invention is to provide an aid for teaching a student whether one quantity is greater than or less than another quantity, an instructor will frequently ask the students to copy problems comprising pairs of spaced apart numerals from a book and then write the proper inequality sign between each pair of numerals. The copying of the problem contributes little to learning.

Another object of the present invention is to provide a teaching aid which will accelerate the teaching of inequalities.

Sometimes instructors will provide students with printed worksheets having problems comprising sets of spaced apart numerals and will ask the students to write the proper inequality sign between the numerals of each set. young children frequently have difficulty writing the inequality sign, and thus the learning process is impeded.

Another concept which sometimes proves especially difficult for young children to grasp is the significance or the order in which the digits are placed in any given number. The children encounter difficulty in distinguishing between the "tens" value digit and the "ones" value digit. For example, a student will confuse the numbers 76 and 67. Still another object of the present invention is to provide apparatus for teaching mathematical relationships between quantities represented by numerals which include the same digits, but in reverse order.

A further object of the present invention is to provide a teaching aid which includes pluralities of quantity-representing numerals disposed at laterally opposite sides of an inequality sign that is selectively movable to positions indicating that the quantity represented at either side thereof is more than or less than the other quantity represented at the other side thereof.

Another object of the present invention is to provide an educational device for the individualized teaching of inequalities including a support member, a plurality of interconnected pages bearing quantity indicating indicia at opposite ends of the support, and an inequality sign movable on the support between positions indicating that either of the quantities represented is larger than the other quantity represented.

Other objects and advantages of the present invention will become apparent to those of ordinary skill in the art as the description thereof proceeds.

SUMMARY OF THE INVENTION

An educational device for the individualized teaching of mathematical relationships comprising support means, a plurality of quantity indicating means representing a plurality of different quantities at opposite ends of the support means selectively movable to positions in which means representing a selected quantity at one end of the support means opposes means representing a selected quantity at the other end of the support means, and means on said support means between the quantity indicating means at opposite ends of the support indicating the mathematical relationships between said quantities represented.

The present invention may more readily be understood by reference to the accompanying drawings, in which.

DESCRIPTION OF THE PREFERRED EMBODIMENT

Figures 1, 2, 3:
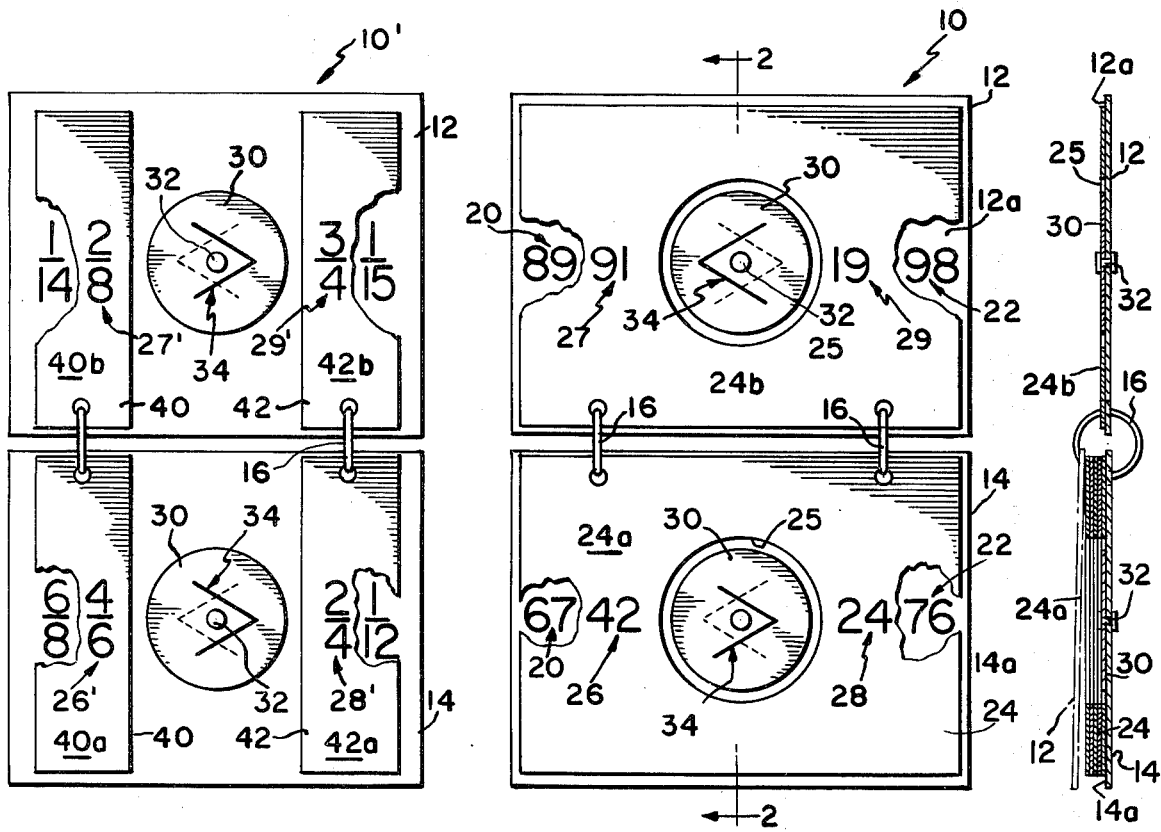
FIG. 1 is a front elevational view of an open teaching aid booklet, constructed according to the present invention, parts of the booklet pages being broken away to more clearly illustrate the booklet covers.
FIG. 2 is a sectional end view of the booklet taken on the line 2—2 of FIG. 1.
FIG. 3 is a view similar to FIG. 1, illustrating a modified construction.

Apparatus constructed according to the present invention comprises a book, generally designated 10, including front and rear covers 12 and 14 connected for swinging movement by hinge loops 16. The covers 12 and 14 are movable between the open positions in prolongation of each other, as illustrated in FIG. 2, and generally coextensive or closed positions as illustrated in chain lines in FIG. 2. Opposite ends of the inside surfaces 12a and 14a of the covers 12 and 14 are printed with numeric symbols, generally designated 20 and 22. The quantities represented by the symbols 20 on each cover may be either greater than or less than the quantities represented by the opposing symbols 22.

Rotatably mounted on each of the covers 12 and 14, by a pivot pin 32, is a flat disc 30 having an inequality sign 34 printed thereon. The discs 30 may be individually rotated to reorient the inequality sign 34 from the positions illustrated in solid lines in FIG. 1 to the positions illustrated in chain lines in FIG. 1 so that they can selectively indicate that the quantities represented by the symbols 20 are either greater than or less than the quantities represented by the symbols 22, depending on the position to which the signs 34 are rotated. For example, the disc 30 on cover 12 is illustrated in a position in which the inequality sign 34 printed thereon indicates that the numeral 98 at the right end of the cover 12 (FIG. 1) is greater than the numeral 89 at the left end of the cover 12. When the inequality sign 34 on the cover 14 is in the position illustrated in chain lines (FIG. 1), it indicates that the numeral 76 at the right end of the cover 14 is greater than the numeral 67 at the left end of the cover 14.

Swingably supported by the hinge loops 16, between the covers 12 and 14, are a plurality of panels or pages 24, each including a centrally located aperture 25 which is of such size and is so positioned as to be aligned with the discs 30 on the covers 12 and 14 when the pages 24 are coextensive with the covers 12 and 14, respectively. Each of the panels or sheets 24 includes a front side 24a printed with numeric symbols, generally designated 26 and 28 on laterally opposite sides of the aperture 25, and a reverse side 24b printed with numeric symbols, generally designated 27 and 29, on opposite sides of the aperture 25.

When the sheets 24 are in the positions adjacent the cover 14, the numeric symbols 26 and 28 are on opposite sides of the disc 30 on sheet 14. When the sheets 24 are swung from the positions adjacent cover 14, as illustrated in solid lines in FIG. 2, to the positions adjacent the cover 12, as illustrated in chain lines in FIG. 2, the numeric symbols 27 and 29 on the reverse side 24b are adjacent the disc 30 on the cover 12. The inequality sign 34 on the cover 14 is used to indicate which of the quantities represented by the symbols 26 and 28 is larger, whereas the inequality sign 34 on the cover 12 is used to indicate which of the quantities represented by the symbols 27 and 29 is larger. For example, the inequality sign 34 on the cover 12 may be moved to the position illustrated in chain lines to indicate the numeral 91 at the left end of sheet 24 is greater than the numeral 19 at the opposite end of sheet 24. When the disc 30 on the cover 14 is in the position illustrated in FIG. 1, the inequality sign 34 indicates that the numeral 42 at the left end of the sheet 24 is greater than the number 24 at the right end of sheet 24.

Young children frequently have difficulty comprehending the order of digits in a multi-digit number. When children can compare numerals having digits which are the same but in reverse order, they will more quickly grasp the relationship. The digits of each of the numerals 20, 26 and 27 are the reverse of the digits of each of the opposing numerals 22, 28, and 29, respectively.

After a fully qualified instructor has demonstrated and explained the inequality concept to students, the students are generally drilled in exercises which helps to fix the inequality concept on the students' mind. Apparatus constructed according to the present invention is particularly useful by a teacher's aide who may successively attend to individual children practicing the exercises.

To utilize the teaching aid 10, the cover 12 of the book is opened to the position illustrated in FIG. 2. The student demonstrates his learning by reorienting the discs 30 so that the inequality sign 34 on the cover 12 is in the position illustrated in FIG. 1, and then reads the sentence formed, i.e., "the numeral 98 is larger than the numeral 89." The inequality sign 34 on the cover 14 is reoriented to the position illustrated in solid lines in FIG. 1 representing that the numeral 42 is greater than the numeral 24. The sheet 24 is then turned to the position illustrated in chain lines in FIG. 1. The student then turns the disc 30 on the cover 12 180° so that the inequality sign is in the position illustrated in chain lines reresenting that the numeral 91 is greater than the numeral 19.

THE MODIFIED CONSTRUCTION

A slightly modified teaching aid booklet 10' is illustrated in FIG. 3 and is identical to the book 10, except that the pages 24 have been replaced by a plurality of individual cards 40 and 42 at opposite ends of the covers 12 and 14. The front sides 40a and 42a of the sheets 40 and 42 are printed with numeric symbols 26' and 28', whereas the rear sides 40b and 42b are printed with numeric symbols 27' and 29'. Because the cards 40 and 42 are individually movable, the quantities represented by the symbols 20 on cover 10' and indicia 27' on sheets 40 may be compared to the quantities represented by the indicia 29' on any of the cards 42. Similarly, the quantities represented by the symbols 26' and 28' on the cards 40 and 42 can be compared with the quantities represented by symbols 28' and 26', respectively, on any of the other cards 42 and 40, respectively. The number of possible combinations for a given quantity of numerals on the cards 40 and 42 is substantially greater than the combination possible with the same quantity of numerals on the cards 24, illustrated in FIG. 1.

MODIFIED EMBODIMENT

Figure 4:
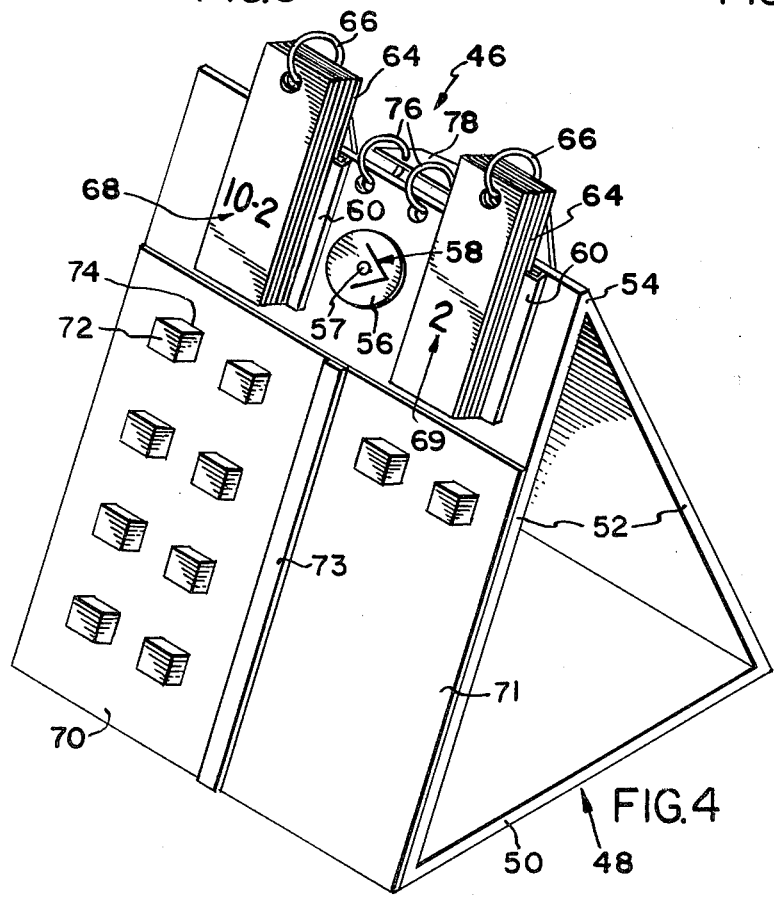
FIG. 4 is a front perspective view illustrating a further modified construction.

The teaching aid, generally designated 46 in FIG. 4, is generally utilized by an instructor at the head of a class, although it should be understood that identical devices, reduced in size, could also be utilized by each of the students at their desks.

The teaching aid 46 includes a triangular frame, generally designated 48, including a base wall 50 and upwardly converging side walls 52 joined at an apex 54. Rotatably mounted on a pin 57 provided on the upstanding front side wall 52 is a disc 56 bearing an inequality sign 58. The upstanding front wall 52 includes a pair of pockets 60 on opposite sides of the disc 56, each mounting one card 64 of a packet of identical cards connected by a hinge loop 66. The cards 64 include quantity representing numeric symbols, generally designated 68 and 69, at opposite ends of the triangular frame 48. Disposed below the packets of cards 64 on the front of the upstanding support member 52 are layers 70 and 71 of felt, separated by a vertical divider strip 73. A plurality of objects 72, corresponding in number to the quantity represented by the symbols 68 and 69, are mounted on the felt layers 70 and 71, respectively, by felt layers 74 provided on the objects 72. This assists the child in visualizing the quantities represented. For example, eight objects 72 are placed on the felt layer 70 to correspond to the quantity (10-2) represented by the indicia 68, whereas two objects 72 are placed on the felt layer 71 to correspond to the quantity (2) represented by the indicia 69.

Figure 5:
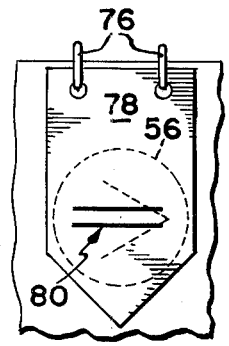
FIG. 5 is an enlarged, front elevational view illustrating a cover, bearing an equality sign, in a position overlying the inequality sign illustrated in FIG. 4.

Pivotally mounted on the apex 54 of the triangular frame 46 by a pair of hinge loops 76 is a card 78, having an equality sign 80 printed thereon, which can be flipped from an inoperative position, illustrated in FIG. 4, to a position illustrated in FIG. 5, overlying the disc 56. If the quantity represented by the numerical symbols 68 equals the quantity represented by the numerical symbols 69, the card 78 is moved to the position illustrated in FIG. 5.

It should be realized, of course, that the numerical symbols on the covers and pages of the various embodiments could comprise printed words, quantity representing pictures, such as a pie, for example, having differently colored portions to pictorially represent a fraction, or other quantity representing indicia.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. An educational device for the individualized teaching of inequalities comprising:
    support means;
    quantity indicating means representing a plurality of different quantities at each end of said support means;

inequality means, disposed between the quantity indicating means at opposite ends of said support means and movable to selected positions on said support means, for selectively indicating that a quantity represented at one end of said support means is greater than a quantity represented at the other end of said support means; and means mounted on said support means swingably mounting said indicating means for turning movement on said support means to and from a position in which said indicating means indicates that a quantity at the other end of said support means is greater than a quantity represented at said one end.

2. The device as set forth in claim 1, including coupling means mounting said quantity indicating means for movement between juxtaposed, stacked positions and unstacked positions.

3. Aan educational device for the individualized teaching of inequalities comprising:

support means;

quantity indicating means representing unequal quantities at opposite ends of said support means; and inequality indicating means movable to selected positions on said support means for indicating that one of said quantities represented is greater than the other quantity represented;

said quantity indicating means comprising a plurality of page panels, swingably connected to said support means, having indicating means representing different quantities, said page panels being coupled for movement between juxtaposed, stacked positions in which selected quantities are represented on laterally opposite sides of said inequality indicating means and unstacked positions.

4. An educational device for the individualized teaching of inequalities comprising:

support means;

a plurality of quantity indicating means for selectively presenting selected ones of a plurality of different quantities at opposite ends of said support means;

inequality indicating means movable to selected positions on said support means for indicating that one of said quantities represented is greater than the other quantity represented; and coupling means on said support means coupling the quantity indicating means at each end of said support means to each other and to said support means for representation of selected quantities at opposite ends of said support means;

said coupling means including means at at least one end of said support means mounting said indicating means for movement such that when one of said quantities indicated is displaced from one end of said support means, another quantity is concurrently presented to said one end.

5. The device set forth in claim 4 wherein said quantity indicating means includes means representing a plurality of quantities at one end of said support means different than the quantities represented at the opposite end of said support means, selectively movable to a position in which means representing selected ones of said quantities are disposed at opposite ends of said support means.

6. The device set forth in claim 5 wherein said inequality indicating means comprises first and second inequality indicating members movably mounted on said support means so as to indicate that a quantity represented at either end of said support means is larger than a quantity represented at the other end of said support means; said quantity indicating means comprising a plurality of page panels having quantity indicating indicia on opposite sides thereof, swingably mounted on said support means for movement between positions adjacent a selected one of said inequality indicating members.

7. The device set forth in claim 6 wherein each of said inequality indicating members comprises a disc rotatably mounted on said support means bearing an inequality sign, said page panels having an aperture movable into alignment with said discs and bearing quantity representing indicia on laterally opposite sides of said aperture.

8. The device set forth in claim 6 wherein said page panels comprise a plurality of individually movable sheets on laterally opposite sides of said inequality indicating members bearing quantity indicating indicia on opposite sides thereof each movable to a position in which the indicia on one side thereof is adjacent one of said discs.

9. The device of claim 5 wherein said quantity indicating means includes a plurality of swingably connected page panels on each lateral side of said inequality indicating means for movement between removed positions and positions adjacent said inequality indicating means.

10. The device set forth in claim 9 wherein said support means comprises an upstanding member mounting said page panels, and apparatus for removably mounting objects in juxtaposition with said panels corresponding to the quantity represented on the page panels.

11. An educational device for the individualized teaching of mathematical relationships comprising:

support means;

a plurality of intercoupled quantity indicating means at each end of said support means, representing a plurality of different quantities, selectively movable to positions in which means representing a selected quantity at one end of said support means opposes means representing a selected quantity at the other end of said support means;

coupling means mounting said indicating means at at least one end for movement such that when one of said quantities indicated is displaced from one end of said support means, another quantity is concurrently presented to said one end; and means coupled to said support means for movement to different positions on said support means between said quantity indicating means for indicating, in said different positions, different mathematical relationships between the quantities represented on opposite ends of said support means.

12. The device set forth in claim 11 wherein said means for indicating the mathematical relationships between the quantities comprises means for selectively indicating that the quantities at opposite ends of said support means are equal and for selectively indicating that the quantity at either end of said support means is greater than the quantity at the other end of said support means.

13. The device set forth in claim 11 wherein said means for indicating the mathematical relationship comprises a disc, rotatably mounted on said support means bearing indicia indicating that the quantity at one end of said support means is greater than the quantity at the other end of said support means, and means for indicating that the quantities at opposite ends of said support means are equal mounted on said support means for movement between a position overlying said disc and a removed position.

14. An educational device for the individualized teaching of inequalities comprising:
   support means;
   a plurality of quantity indicating means representing unequal quantities at opposite ends of said support means;
   inequality indicating means movable to selected positions on said support means for indicating that the quantity represented at either selected end of said support means is greater than the other quantity represented at the other end; and
   coupling means on said support means coupling said quantity indicating means to each other and to opposite ends of said support means for representation of selected quantities at opposite ends of said support means;
   said quantity indicating means comprising a series of swingable connected page panels providing a plurality of quantity indicating means on laterally opposite sides of said inequality indicating means.

15. An educational device for the individualized teaching of inequalities comprising:
   a pair of swingably connected covers constituting support means;
   quantity indicating means representing unequal quantities at opposite ends of said support means; and
   inequality indicating means movable to selected positions on said support means for indicating that one of said quantities represented is greater than the other quantity represented;
   said quantity indicating means comprising a series of page panels, swingably connected to and disposed between said covers, having indicating means representing different quantities, selected ones of said page panels being movable to positions in which selected quantities are represented on laterally opposite sides of said inequality indicating means.

* * * * *